US008690157B2

(12) United States Patent
Logan

(10) Patent No.: US 8,690,157 B2
(45) Date of Patent: Apr. 8, 2014

(54) MODIFIED POKER CARD GAMES USING PARTIAL COMMUNITY CARDS

(76) Inventor: Scott Logan, Palm City, FL (US)

( * ) Notice: Subject to any disclaimer, the term of this patent is extended or adjusted under 35 U.S.C. 154(b) by 0 days.

(21) Appl. No.: 13/565,412

(22) Filed: Aug. 2, 2012

(65) Prior Publication Data

US 2013/0033003 A1 Feb. 7, 2013

Related U.S. Application Data

(60) Provisional application No. 61/515,540, filed on Aug. 5, 2011.

(51) Int. Cl.
*A63F 1/00* (2006.01)
*A63F 13/00* (2006.01)

(52) U.S. Cl.
USPC .......................................... 273/292; 463/13

(58) Field of Classification Search
USPC ............................ 273/292, 274, 309; 463/13
See application file for complete search history.

(56) References Cited

U.S. PATENT DOCUMENTS

| | | | | |
|---|---|---|---|---|
| 2007/0182098 | A1* | 8/2007 | Gordon et al. | 273/292 |
| 2009/0020951 | A1* | 1/2009 | Colacone | 273/292 |
| 2009/0250877 | A1* | 10/2009 | Matanky | 273/292 |

* cited by examiner

*Primary Examiner* — Benjamin Layno
(74) *Attorney, Agent, or Firm* — McHale & Slavin, P.A.

(57) ABSTRACT

The instant invention describes a new method of poker card games which allow a player to form a winning hand based on the five best cards chosen from at least two whole cards, at least three community cards, and one or more partial community cards. The format of the game in accordance with the instant invention provides card games using community style card distribution with a plurality of additional cards to be used by players during game play.

18 Claims, 15 Drawing Sheets

MODIFIED POKER CARD GAMES USING PARTIAL COMMUNITY CARDS

CROSS REFERENCE TO RELATED APPLICATIONS

The present invention claims priority under 35 U.S.C. §119 (e) to U.S. Provisional Application 61/515,540, entitled "MODIFIED POKER CARD GAMES USING PARTIAL COMMUNITY CARDS" filed on Aug. 5, 2011, the contents of which are herein incorporated by reference in its entirety.

FIELD OF THE INVENTION

The present invention is related to card games, and more particularly to card games using the general rules associated with poker games using community cards which may be used by all players to form winnable hands in combination with partial community cards for use by individual players.

BACKGROUND OF THE INVENTION

Numerous card games are known to exist. Of particular popularity are those card games under the category of poker games. Poker games include a plurality of games that have similar betting rules and generally define winning hands based on the types of card held by each player, and the arrangement, or rankings, of those cards. While there are a variety of card games with different means of winning, card games using community cards, such as Texas Hold'em have gained tremendous popularity over the last several years. The object of Texas Hold'em, and derivative games, is to form the highest card ranking by choosing the best five cards from a hand which contains two individual cards, and five cards which all the players can use, called community cards.

While games using community cards have generated a lot of excitement, the amount of cards used in such games can be limiting. Therefore, what is needed in the poker game field is a new game which introduces more cards into the playing rounds, thereby changing the player's strategy and chances of winning.

SUMMARY OF THE INVENTION

The instant invention, and variations, describe a new method of poker card games which allows players to form a winning hand based on the five best cards chosen from at least two hole cards, at least three community cards, and one or more partial community cards. The format of the game in accordance with the instant invention provides card games using community-style card distribution with a plurality of additional cards to be used by players during game play, thereby changing a player's game play strategy as well as changing the odds of obtaining winning hands. The additional cards are partial community cards in that all players can view the cards and use the information to form card play strategy; however, only the player who received the cards can use them to form a winning hand.

In an illustrative embodiment of the method of playing a modified poker game using one or more individual use cards, or one or more community cards, and one or more partial community cards in accordance with the present invention, the method comprises the steps of: providing at least one full deck of standard playing cards, each card having a value which forms a winning hand; providing one or more individual players for receiving a plurality of playing cards from said at least one deck; distributing a first set of individual use cards, individual use card or whole card to each individual player playing said game, said first set of playing cards comprising cards from said playing deck and having a card value which can only be used by each individual holding said cards in forming a winning hand, said first set of cards distributed in a manner so that only said individual receiving said cards can view; distributing a second set of playing cards, individually termed as a community card, to form a plurality of community cards, said second set of playing cards comprising cards from said playing deck and having a card value in which each individual player can view and use to form a winning hand; distributing a third set of playing cards, individually termed as a partial community card, to form one or more partial community cards, said third set of playing cards comprising cards from said playing deck and having a card value in which each player playing said game can view, but only said individual player for which said card has been distributed thereto can use to form said winning hand; and determining a winning card hand, said winning card hand having the highest card rank obtained from said first set of cards, said second set of cards, and said third set of cards. The method preferably includes at least one betting round and is designed so each player is competing against other individual players or against the house, i.e. playing against a dealer.

Accordingly, it is an objective of the instant invention to provide a method of playing a card game which uses community cards used by all players to form winnable hands in combination with partial community cards which are viewable by all players but may only be used to form a winnable hand by the individual player who received the cards.

It is a further objective of the instant invention to provide a method of playing a card game which is based on Texas-Hold'em rules.

It is yet another objective of the instant invention to provide a method of playing a card game which plays an additional number of cards compared to a traditional Texas-Hold'em card game.

It is a further objective of the instant invention to provide a method of playing a card game in which the winning hand is based on the five best cards chosen from at least two whole cards, at least three community cards, and one or more partial community cards.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
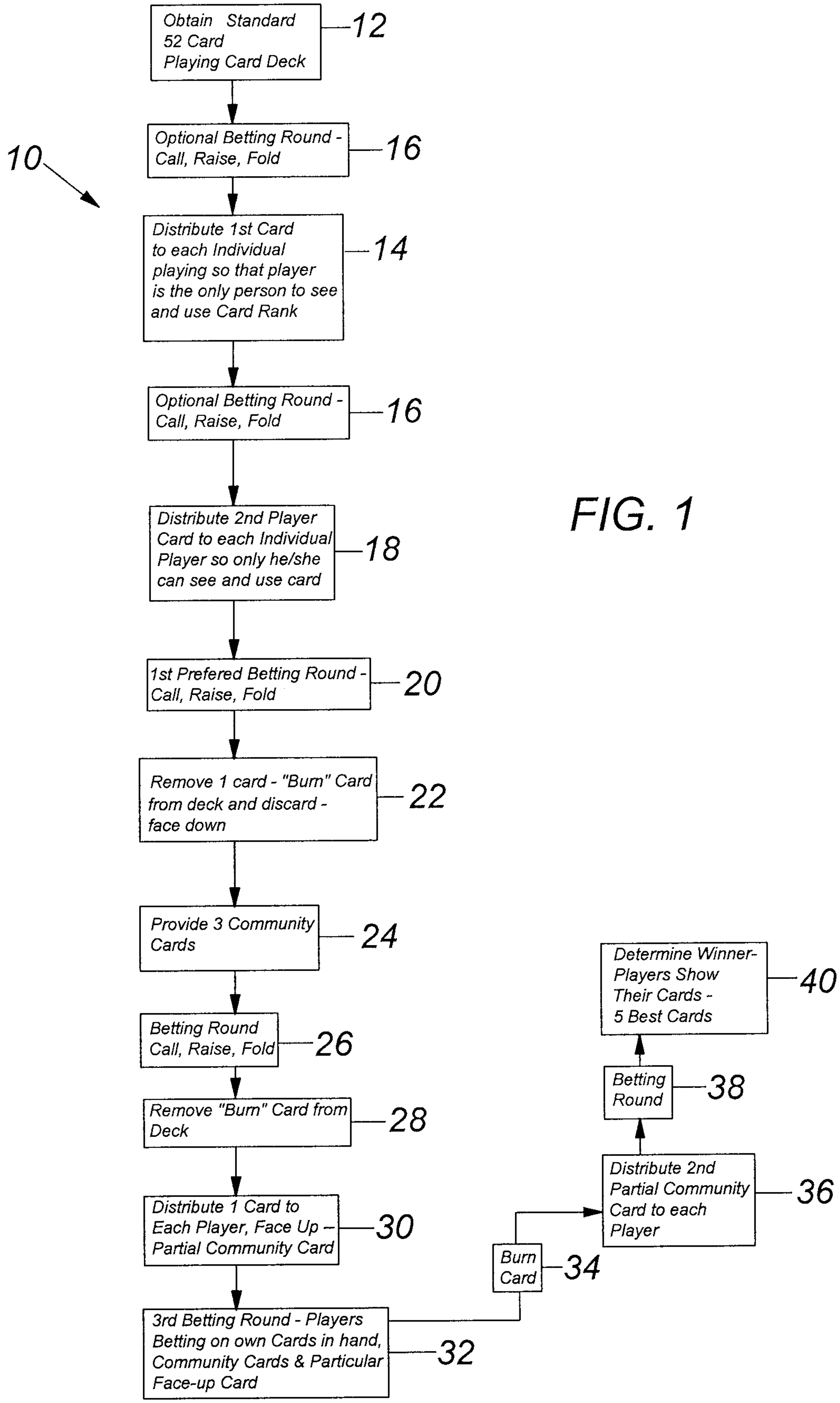
FIG. 1 is a flowchart illustrating the primary steps of the card game in accordance with the instant invention.
Figure 2:
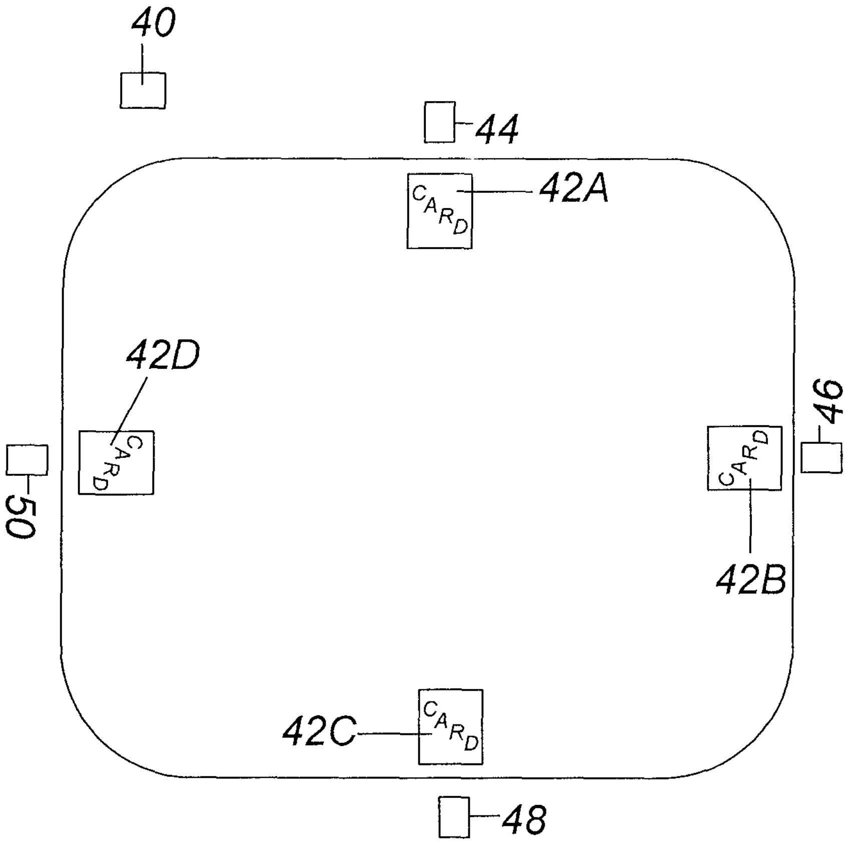
FIG. 2 is a graphic illustration of the first card distribution round in accordance with the card game outlined in FIG. 1.
Figure 3:
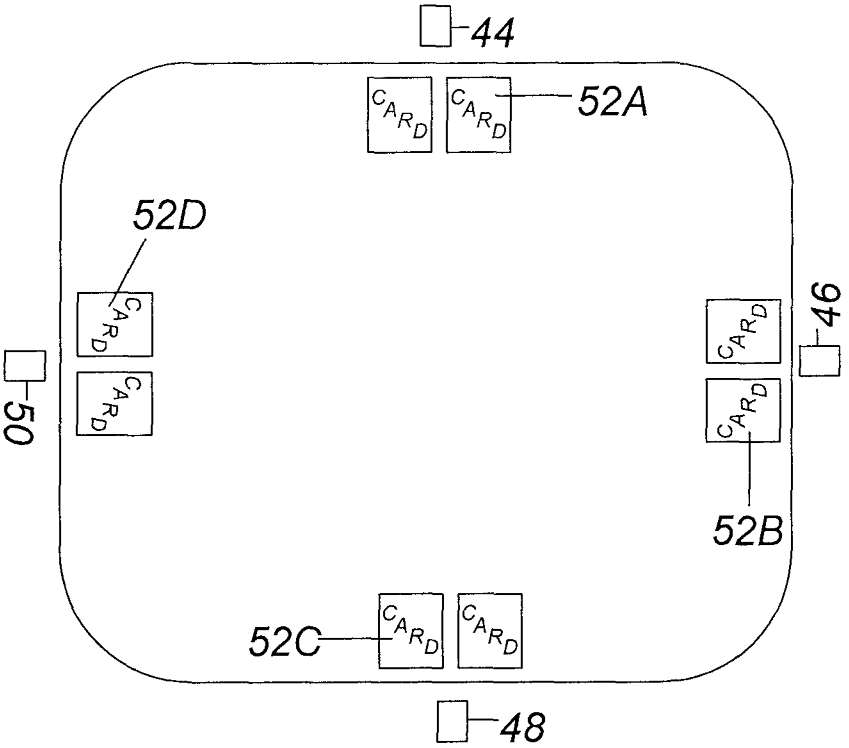
FIG. 3 is graphic illustration of the second card distribution round in accordance with the card game outlined in FIG. 1.
Figure 4:
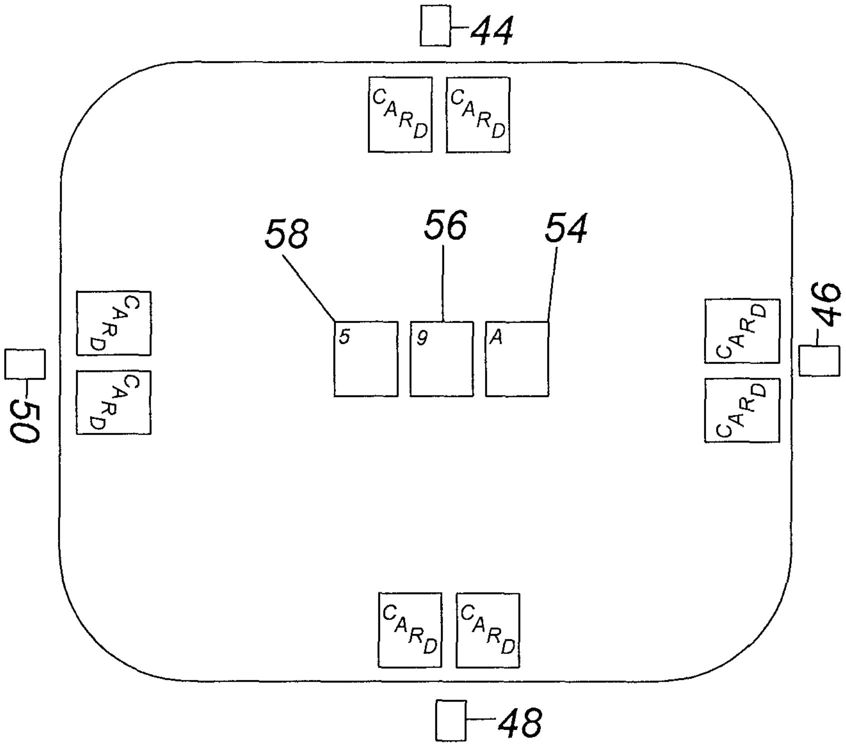
FIG. 4 is graphic illustration of the third card distribution round, shown as a three card community card flop, in accordance with the card game outlined in FIG. 1.
Figure 5:
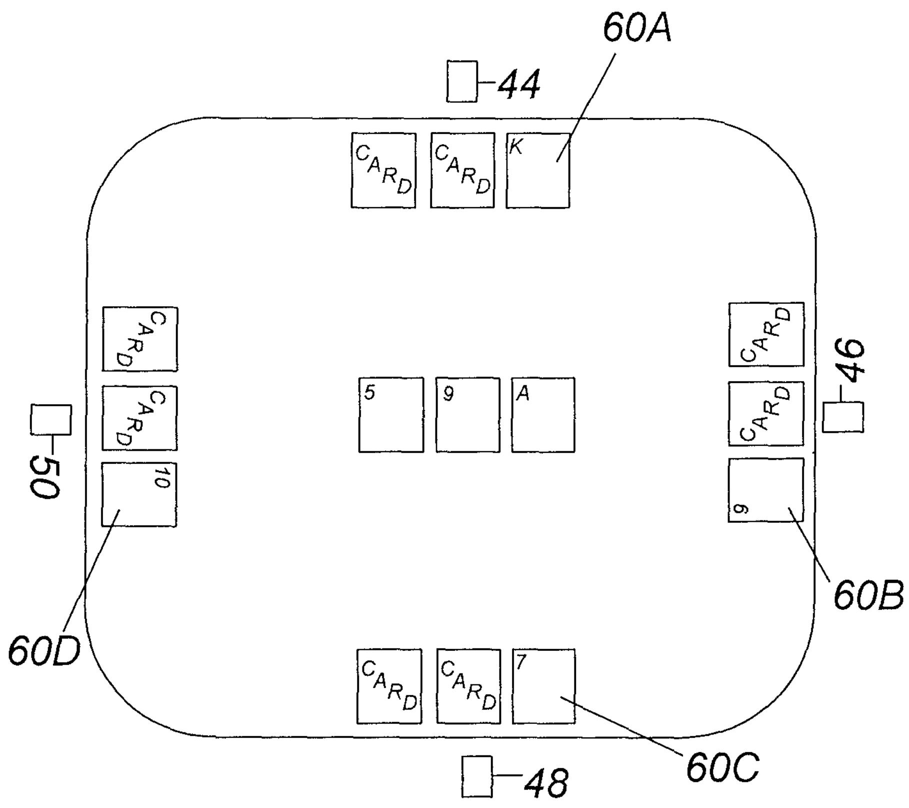
FIG. 5 is graphic illustration of the fourth card distribution round, the first partial community card distribution, in accordance with the card game outlined in FIG. 1.
Figure 6:
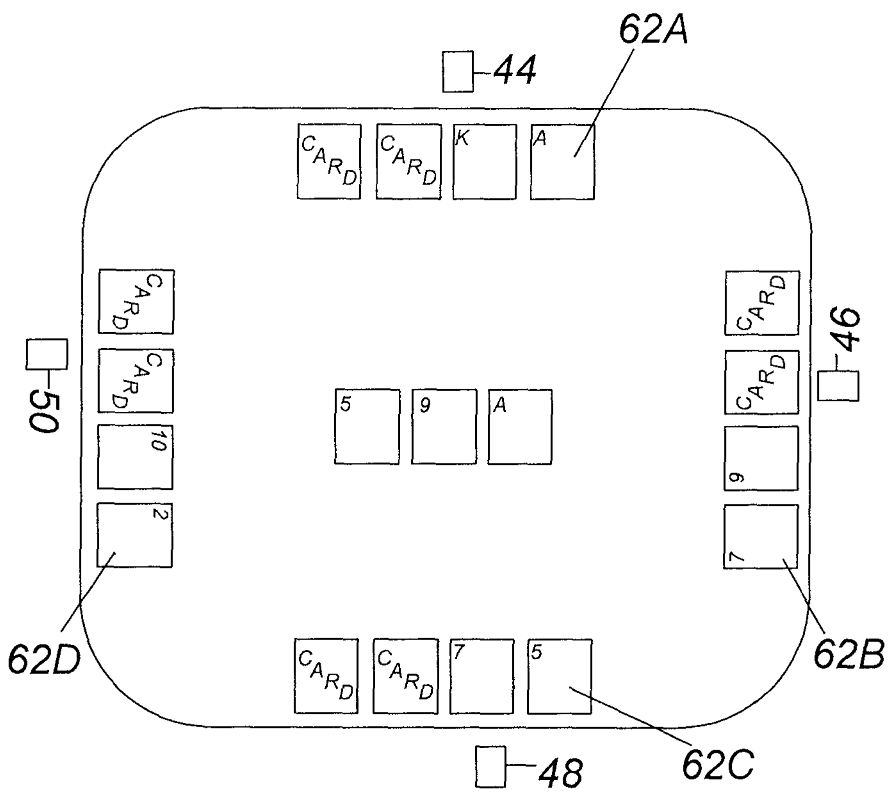
FIG. 6 is graphic illustration of the fifth card distribution round, the second partial community card distribution, in accordance with the card game outlined in FIG. 1.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention provides new methods of playing poker style card games. Although a winning hand may be defined in many ways, a preferred winning hand in accordance with the instant invention is obtaining the highest valued cards to obtain the highest card rankings through the use of a plurality of cards which are delivered in a variety of manners. In a typical card game in accordance with the instant intention, individual payers obtain winning hands through the use of 1) secret cards delivered to the individual players, defined as hole cards, in which only the players which have received those cards can view and use them to obtain a winning hand, 2) community cards, defined as those cards delivered during the course of game play in which all players can both view and use in order to obtain a winning hand, and 3) partial community cards, defined as those cards delivered during the course of game play in which all players can view, but only the player to which the card was delivered may use to form a winning hand. The instant invention, therefore, provides for modification to existing card games. By providing a card game using partial community cards, additional cards are used during the course of the game, creating a game which requires different strategies for winning.

Referring to FIG. 1, the method of game play is outlined and referred to generally as 10. As an illustrative example, the method of game play is played on a live gaming table, at for instance a casino, using a dealer and a plurality of individuals where each individual is competing against each other player, with the highest ranking hand winning. Additionally, the game can be played against the house wherein each individual is playing against the dealer, not the other players, similar to Black-Jack. In such case, as long as each individual player has a winning hand relative to the dealer, he or she wins. FIGS. 2-7 graphically illustrate the steps of the method 10. In the illustrations, only four players are shown. The number of players may vary, preferably between 2 and 10. The game begins with a dealer 40 obtaining a standard fifty-two card deck (step 12). The dealer may be an independent person from the game players or may be one of the game players. The dealer 40 distributes a first card 42A (first round cards) to a first player 44 so that only the first player 44 knows what the card is, step 14. The dealer distributes the first cards 42B, 42C, and 42D to the remaining players, a second player 46, a third player 48, and a fourth player 50. The first cards are delivered in the same manner as delivered to the first player 44, face down so only the individual players know the make-up of the card. An optional betting round, step 16, may be undertaken by the players. The initial betting round begins with all players calling or raising a blind. In this and all betting rounds, players 44, 46, 48, and 50 take turns either placing/raising a bet, calling a bet, or folding. The betting round starts with the appropriate player placing a bet based on the cards dealt to them. Once one player places a bet, the next player decides to either raise the bet or meet the bet (call) of the previous player. At any time during the betting round, should they no longer desire to play the round, they can fold and leave the game. Betting ends when every player has either folded, put in all of their chips, raised the previous bet, or matched the amount put in by all other active players. It is contemplated that in any embodiment described herein, the number of betting rounds can be varied, and can include bonus or extra betting rounds. In addition, the timing of when one or more of the betting beating rounds occurs can be varied so that a betting round can occur at any point or step in any of the methods in accordance with the present invention.

The betting and game continues with the remaining players. Once the betting in step 16 is done or is skipped, the dealer 40 distributes another set of cards (second round cards), second cards 52A-52D to the players 44, 46, 48 and 50 (step 18). A preferable first betting round, step 20, (or second round if the previous betting round in step 14 was not skipped) is undertaken by the players. Each of the players 44, 46, 48, and 50 has the option of betting, raising, calling, or folding, as described previously. At this point in the game, each of the players is aware of their individual cards, and can use those cards in his/her hand only. Betting strategy and forming a winnable hand strategy may be based on the cards in each hand. The dealer 40 then removes a card, the burn card, from the deck, step 22. This card is not shown to any of the players and is removed from the game. After the burn card has been removed, the dealer 40 distributes 3 three cards, 54, 56, and 58, step 24 (collectively round 3 distribution). These cards are delivered face-up so that all players, 44, 46, 48, and 50 can view the value of the cards. Cards 54, 56, and 58 are termed community cards as all players that remain in the game cannot only see these cards, but can also use them in some combination with the two previously distributed, face down cards, 42 and 52 from rounds 1 and 2. Once the community cards have been dealt, the players 44, 46, 48, and 50 enter into a betting round, step 26, in which each player bets, raises, calls, or folds. The betting strategy is based on the cards that each player has from rounds 1 and 2, i.e. cards 42 and 52, and the community cards 54, 56, and 58.

Figure 7:
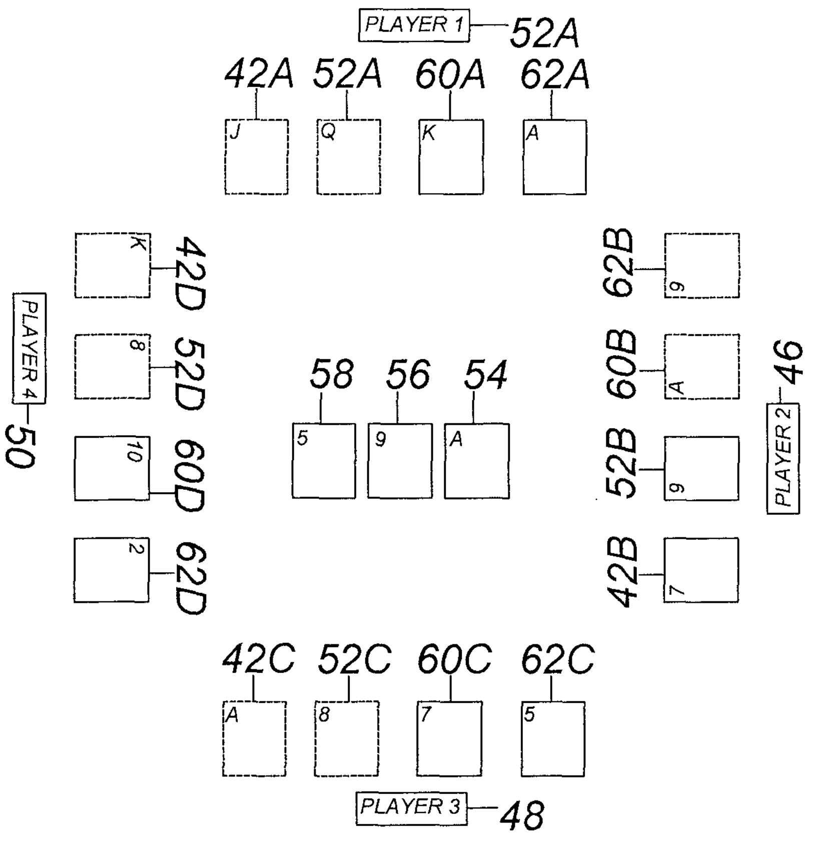
FIG. 7 is graphic illustration of a complete round of card distribution in accordance with the card game outlined in FIG. 1.

Once the betting round from step 26 is complete, the dealer 40 removes a burn card from the deck, step 28. The dealer 40 then begins a fourth round (Turn) of card play by distributing cards 60A, 60B, 60C, and 60D to players 44, 46, 48, and 50 respectively. Cards 60A-60D are distributed face up so that the community, or all players, can view the cards and determine their playing value. While these cards are community cards, they are community viewable only. The values that the cards represent are only usable for the individual player to which each of the cards was delivered to. By providing for a fourth round to be a partial community card, strategies change as there are more cards in play and useable, at least by one player, during the game. The more cards that are used, the greater the opportunity to form different hands, whether winnable or losable. FIG. 7 is an illustration of the 4-player round after all cards have been distributed. Cards outlined in broken lines are hole cards not seen by anybody but the individual player. Cards having solid lines are partial community cards delivered face up. As shown, unlike traditional Texas Hold'em, or derivates, there exists many more cards on the table, thereby changing the flow and outcome of the game.

Once the betting round 32 is complete, the dealer removes a burn card from the deck, step 34. With the burn card removed, the dealer 40 distributes a fifth round (River) of cards 62A-62D, step 36, as in the fourth round. The cards are delivered in a face-up manner so that all players can view the cards. However, only the players for which the card was delivered can use that card value for forming a winnable hand. These cards are partial community cards. Since the entire card delivery rounds are complete, the final betting round, step 38, is undertaken as before. Once all betting is complete, the players enter into the final stage of the game, often termed the Showdown, in which the player with the best hand wins, step 40. The player who bet on the fifth card round is usually the default player to reveal their hand first. However, if any other player decides to show their cards first, they may do so. If all players checked in the betting round, one player must be determined to show their cards. Typically, the player to the left of the dealer 40 must show their cards first, followed by the next player in a clockwise position around the table. If a player is holding a losing hand, that player may decide not to show the cards and admit to a losing hand.

Once all hands are revealed, the winning hand is determined by evaluating each player's hand using any combination of the player's first two cards (the hole cards), the three community cards, and the two partial community cards for the best five cards. Each player therefore, can use none, one or both of the first-second round cards in order to determine the best hand, any of the community cards 54, 56, and 58, and only the limited community cards 60 or 62 that were delivered to them. Rules for winning a hand are determined in accordance with Texas Hold-um rules. Player hands are evaluated by the ranking in Table 1.

TABLE 1

| Hand Rankings: | |
|---|---|
| NAME | DESCRIPTION |
| Royal Flush | Highest hand possible: A straight flush is a hand having cards from a ten to an ace, with all five cards of the same suit. |
| Straight Flush | A straight flush is a hand that contains five cards in sequence, all of the same suit. |
| Four of a Kind | A four of a kind is any hand having any four cards of the same rank. |
| Full House | A full house is a hand having three cards of the same rank in combination with any two cards of the same rank. |
| Flush | A flush is a hand having any five cards of the same suit, which are not consecutive. The highest card of the five determines the rank of the flush. |
| Straight | A straight is a hand having any five consecutive cards of different suits. Aces can count as either a high or a low card. |
| Three of a Kind | A three of a kind is any hand having any three cards of the same rank. |
| Two Pair | Two pair is any hand having any two cards of the same rank together with another two cards of the same rank. |
| High Card | Lowest hand possible: Any hand not containing rankings above. High-card hands are ranked by comparing the highest ranking card for each hand. If the highest ranking cards are equal, then the next highest ranking card from each hand is compared, and so on until a difference is found. |

The best five cards are used to evaluate the hands. If two players have the same winning cards, both are declared the winner and the pot (the amount of money/chips bet) is split between them. Suits are not used to evaluate the strength of a hand.

Referring to FIGS. 8-15, alternative versions of the game using partial community cards in different parts of the game is shown.

Alternative Version 1: Short-Cut Hold'em

Figure 8:
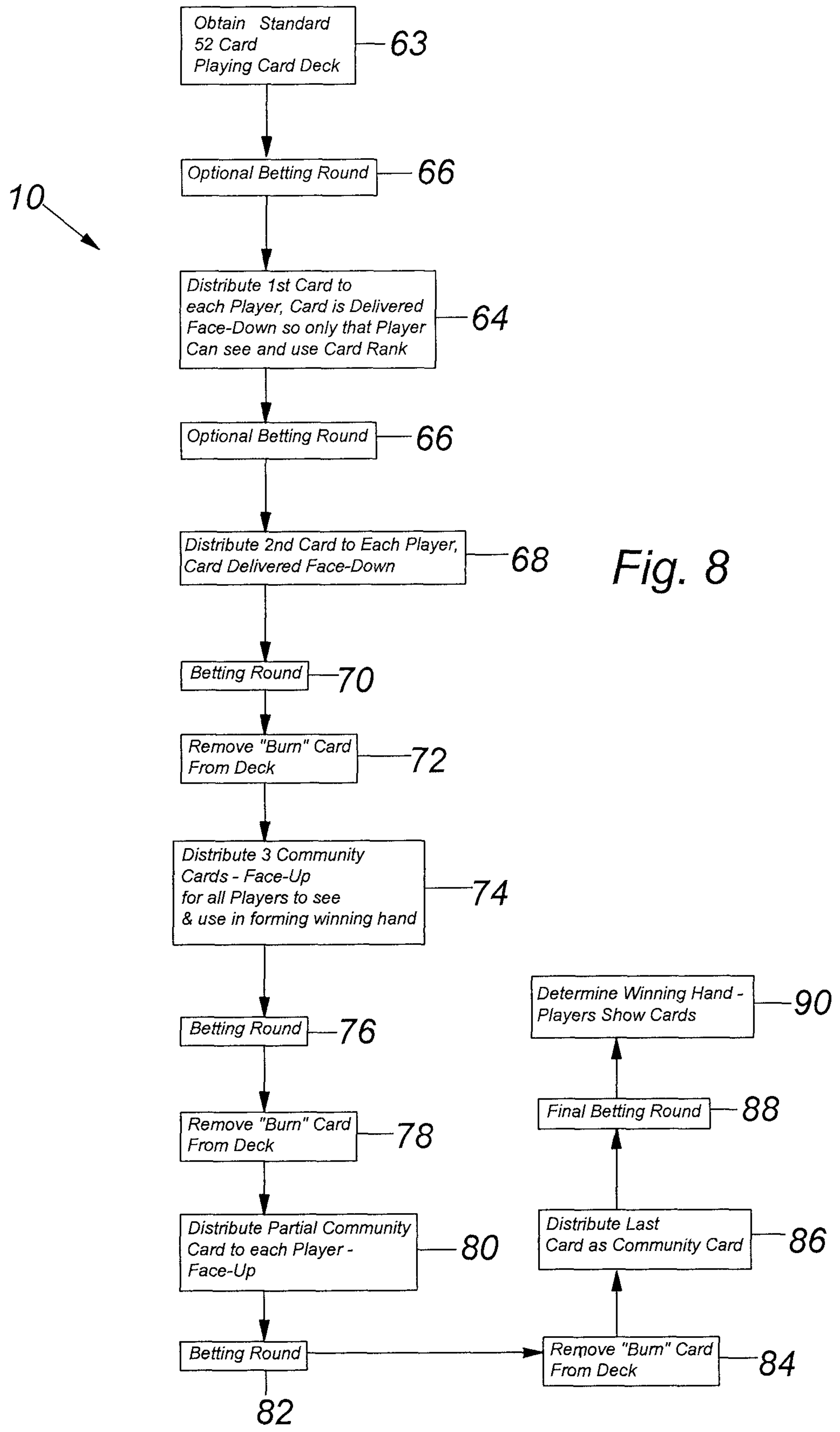
FIG. 8 is a flowchart illustrating the primary steps of an alternative version, known as Short-cut Cut-off Hold'em, of the card game in accordance with the instant invention.

Referring specifically to FIG. 8, the game is played in much the same way as shown in FIG. 1. The game starts by the dealer obtaining a standard deck of cards, step 63, and delivering 2 face-down cards, or hole cards, to each player, steps 64 and 68. Betting occurs preferably after the two cards have been delivered to each player, step 70. However, a first betting round may be done after the first hole card has been properly distributed, step 66. After all players have had an opportunity to place their bet, the dealer removes a burn card, step 72, before delivering three community cards, step 74. These community cards are delivered face-up so all players can view their value. Additionally, each player can also use one, two, or three of these cards in determining their card-hand value. A betting round occurs, step 76. The dealer removes a burn card, step 78, and delivers a fourth round of cards to each player. The fourth card round, step 80, is dealt in a face-up manner so that all players can view the cards value. However, the card is a partial community card since the value of the card delivered can only be used by the individual player who received the card. While the individual player is the only one who may use the card in forming a winning hand, other players can use the information, i.e. the card value showing, to help determine how to play-out the game, including how to bet or to decide should he/she remain in the game. After a betting round, step 82, and removal of a burn card, step 84, the dealer delivers a final round, a single community card, step 86. This card is a traditional community card in that each player can use the card value in forming a winning hand. A final round of betting is undertaken, step 88. Once the betting is complete, the players reveal their cards, step 90. The player with the highest hand wins.

Alternative Version 2: Final-Cut Hold'em

Figure 9:
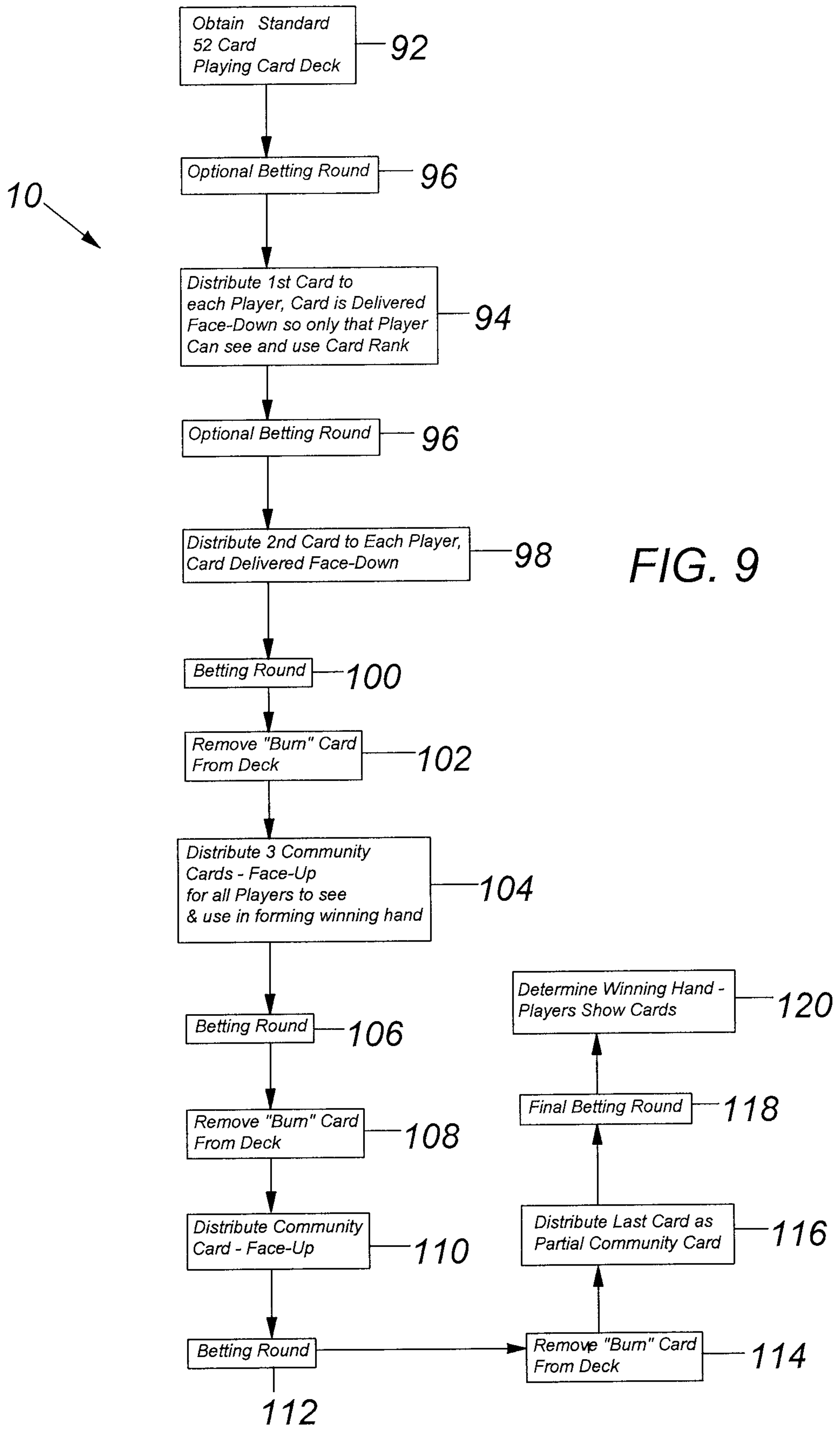
FIG. 9 is a flowchart illustrating the primary steps of an alternative version, known as Final-cut Cut-off Hold'em, of the card game in accordance with the instant invention.

Referring to FIG. 9, an alternative version of the game using partial community cards as outlined in FIG. 1 is shown. The game is played in much the same way as shown in FIG. 1. The game starts by the dealer obtaining a fifty-two card playing deck, step 92, and delivering two face-down cards, or hole cards, to each player, step 94 and 98. Betting preferably occurs after the two hole cards have been delivered to each player, step 100. However, a first betting round, step 96, may be done after the first hole card has been properly distributed. After all players have had an opportunity to place their bet, the dealer removes a burn card, step 102, before delivering three community cards, step 104. These community cards are delivered face-up so all players can view their value. Additionally, each player can also use one, two, or three of these cards in determining their card-hand value. A betting round occurs, step 106. The dealer removes a burn card, step 108, and delivers a fourth round of a single card, step 110. The fourth card is a traditional community card, delivered face-up. Each player can use the card value in forming a winning hand. A round of betting is undertaken, step 112 and a burn card is removed, step 114. The fifth and final round of cards is delivered to each player, step 116. Each player receives one partial community card. The fifth round card is delivered face-up so all players can view the value of each of the cards that were dealt. However, the card is a partial community card since the value of the card delivered can only be used by the individual party who received that card. While the individual player is the only one who may use the card in determining an overall winning hand, other players can use the information, i.e. the card value showing, to help determine how to play-out the game, including how to bet, should he/she remain in the game. A final round of betting is undertaken, step 118. Once the betting is complete, the players reveal their cards, step 120. The player with the highest hand wins.

Alternative Version 3: Cut-Pineapple

Figure 10:
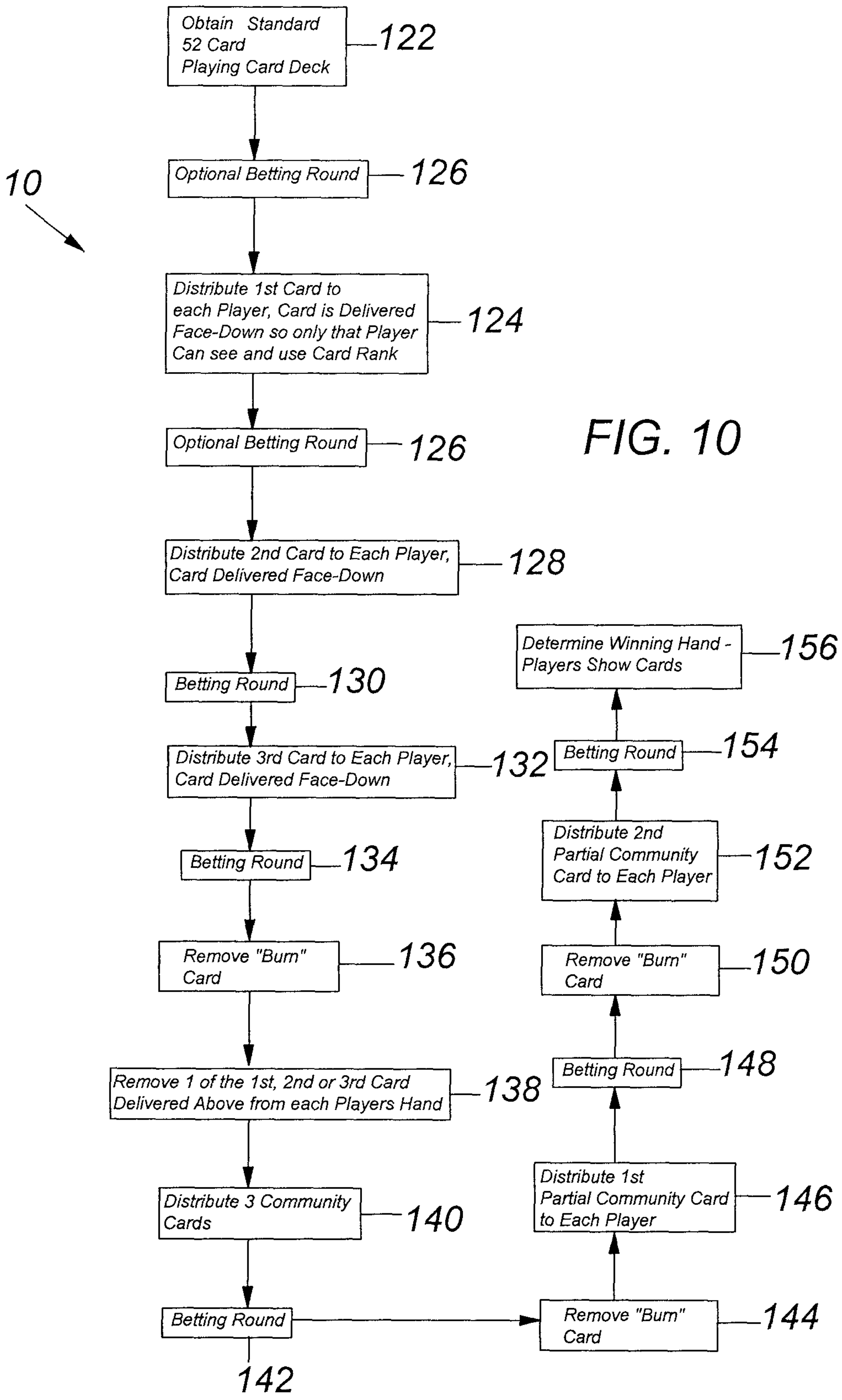
FIG. 10 is a flowchart illustrating the primary steps of an alternative version, know as Cut-Pineapple, of the card game in accordance with the instant invention.

Referring to FIG. 10, an alternative version of the game using partial community cards is shown. The game starts by the dealer obtaining cards from a standard deck, step 122, and delivering three face-down cards (Rounds 1-3), or hole cards, to each player, steps 124, 128, and 132. Each of the players discard one of the three face-down cards from his/her hand, step 138. These discarded cards are removed from the game. Betting preferably occurs after the three cards have been delivered to each player, step 134. However, a first or second betting round may be done after one or two hole cards have been properly distributed, steps 126, 130. After all players have had an opportunity to place their bet in betting round 134, the dealer removes a burn card, step 136, before delivering three community cards (Round 4), step 140. These community cards are delivered face-up so all players can view their value. Additionally, each player can also use one, two, or three of these cards in determining their card-hand value. A betting round occurs, step 142. The dealer removes a burn card, step 144, and delivers a fifth round of cards to each player, step 146. The fifth round card is a partial community card and is delivered face-up. All players can view the value of the card, however, only the player who received the card can use its value in determining his/her winning hand. A betting round occurs, step 148. The dealer removes a burn card 150 and a sixth and final round of cards are delivered to each player, step 152. The final round cards are partial community cards. A single card is delivered to each player face-up to each individual player. Since the cards are delivered face up, all players can view the card rank; players cannot use the card rank to form winning hands. A final betting round is performed, step 154, and the players enter the showdown, step 156, by revealing their cards. The player with the highest hand wins.

Alternative Version 4: Short Cut-Pineapple

Figure 11:
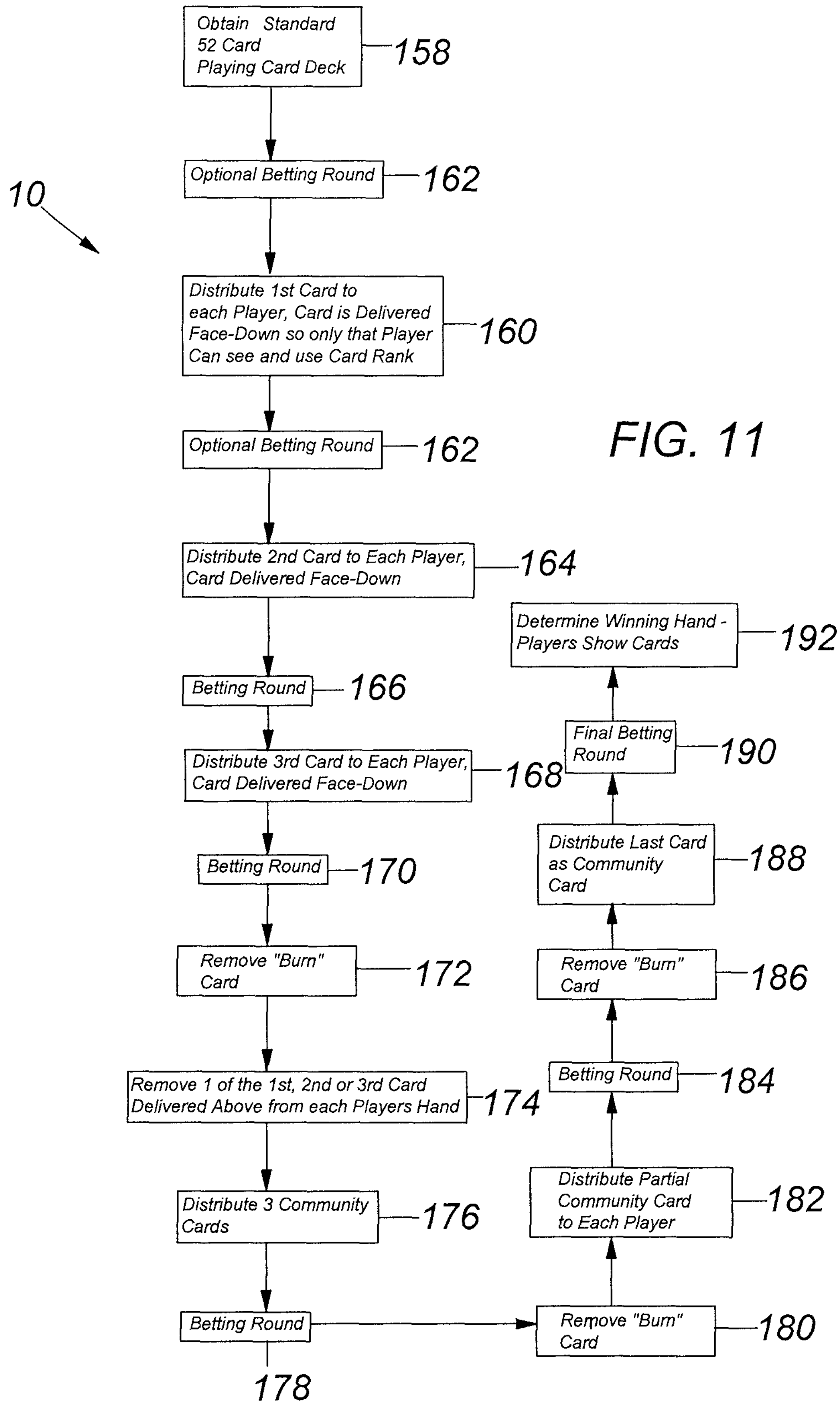
FIG. 11 is a flowchart illustrating the primary steps of an alternative version, known as Short-cut Cut Pineapple, of the card game in accordance with the instant invention.

Referring to FIG. 11, an alternative version of the game using partial community cards is shown. The game starts by the dealer obtaining cards from a standard card deck, step 158 and delivering three face-down cards, or hole cards, to each player, steps 160, 164, and 168 (Rounds 1-3). Betting preferably after the three cards have been delivered to each player, step 170. However, several pre-betting rounds may be undertaken, steps 162 and 166, after one or two hole cards have been properly distributed. After all players have had an opportunity to place their bet, the dealer removes a burn card, step 172. Before delivering three community cards, each player must remove one of the hole cards delivered to them previously, step 174. These discarded cards are removed from the game. The dealer then delivers three community cards (Round 4), step 176, face-up so all players can view their value. Additionally, each player can also use one, two, or three of these cards in determining their card-hand value. A betting round occurs, step 178. The dealer removes a burn card, step 180, and delivers a fifth round of cards to each player, step 182. The fifth round card is dealt in a face-up manner to each player so that all players can view the cards value. However, the card is a partial community card since the value of the card delivered can only be used by the individual player who received the card. While the individual player is the only one who may use the card in determining an overall winning hand, other players can use the information, i.e. the card value showing, to help determine how to play-out the game, including how to bet, should he/she remain in the game. After a betting round, step 184, and removal of a burn card, step 186, the dealer delivers a final round, a single community card, step 188. This card is a traditional community card in that each player can use the card value in forming a winning hand. A final round of betting is undertaken, step 190. Once the betting is complete, the players reveal their cards, step 192. The player with the highest hand wins.

Figure 12:
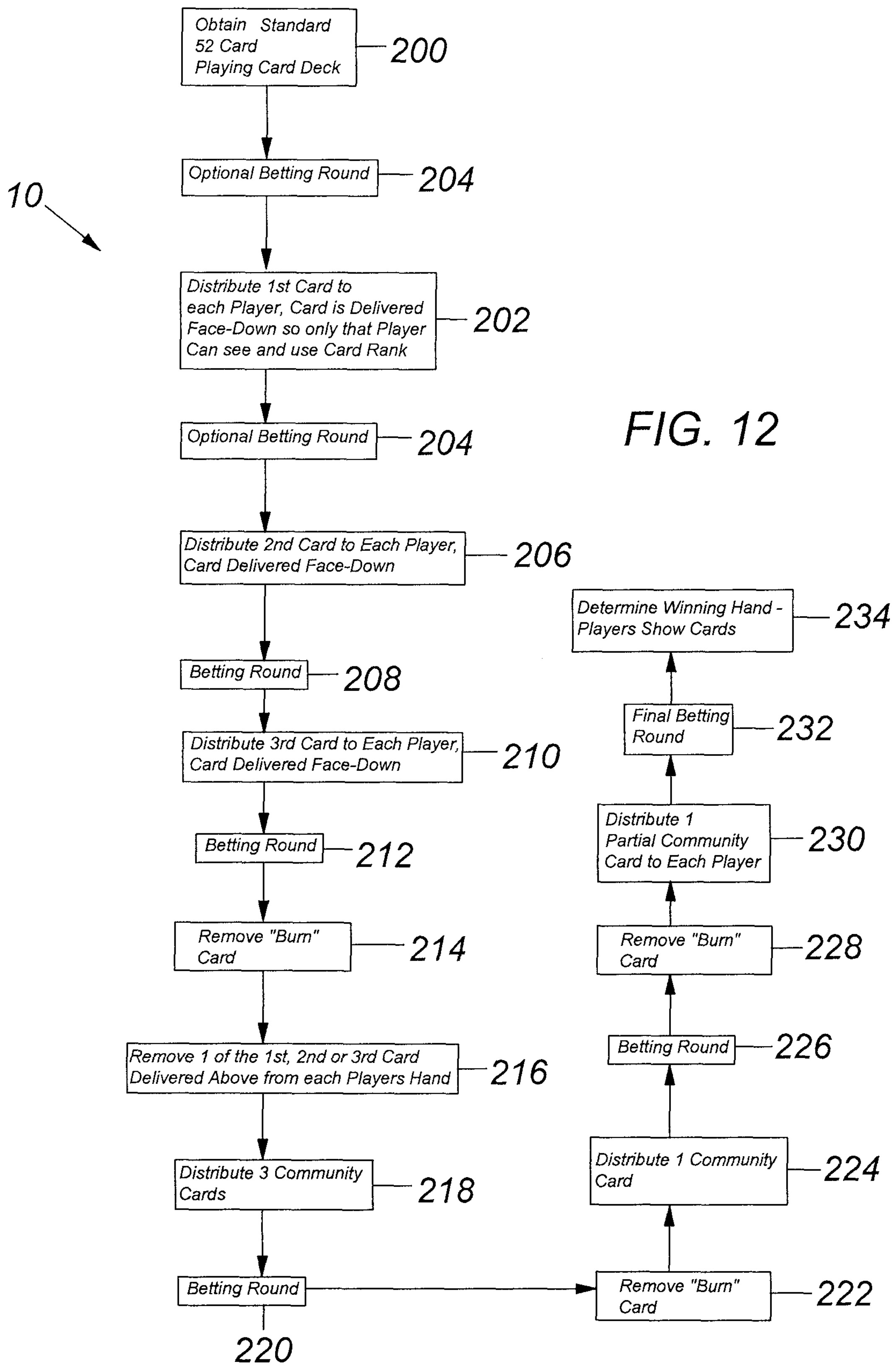
FIG. 12 is a flowchart illustrating the primary steps of an alternative version, known as Final-cut, Cut Pineapple, of the card game in accordance with the instant invention.

Alternative Version 5: Final Cut Pineapple:

Referring to FIG. 12, an alternative version of the game using partial community cards is shown. The game starts by the dealer obtaining cards from a standard deck, step 200, and delivering three face-down cards (Round 1-3), or hole cards, to each player, steps 202, 206, and 210. After all players have had an opportunity to place their bet, the dealer removes a burn card, step 214. Each of the players discards one of the three hole cards from his/her hand, step 216. These discarded cards are removed from the game. The dealer then delivers three community cards (Round 4), step 218. These community cards are delivered face-up so all players can view their value. Additionally, each player can also use one, two, or three of these cards in determining their card-hand value. A betting round occurs, step 220. The dealer removes a burn card, step 222, and delivers a fifth round of cards to each players, step 224. The fifth card is a traditional community card, delivered face-up. Each player can use the card value in forming a winning hand. A round of betting is undertaken, step 226. The dealer removes a burn card, step 228. The fifth and final round of cards is delivered, step 230. Each player receives one partial community card. The fifth round card is delivered face-up so all players can view the value of each of the cards that were dealt. However, the card is a partial community card since the value of the card delivered can only be used by the individual party who received that card. While the individual player is the only one who may use the card in determining an overall winning hand, other players can use the information, i.e. the card value showing, to help determine how to play-out the game, including how to bet, should he/she remain in the game. A final round of betting is undertaken, step 232. Once the betting is complete, the players reveal their cards, step 234. The player with the highest hand wins.

Alternative Version 5: Crazy-Pineapple Cut-Off

Figure 13:
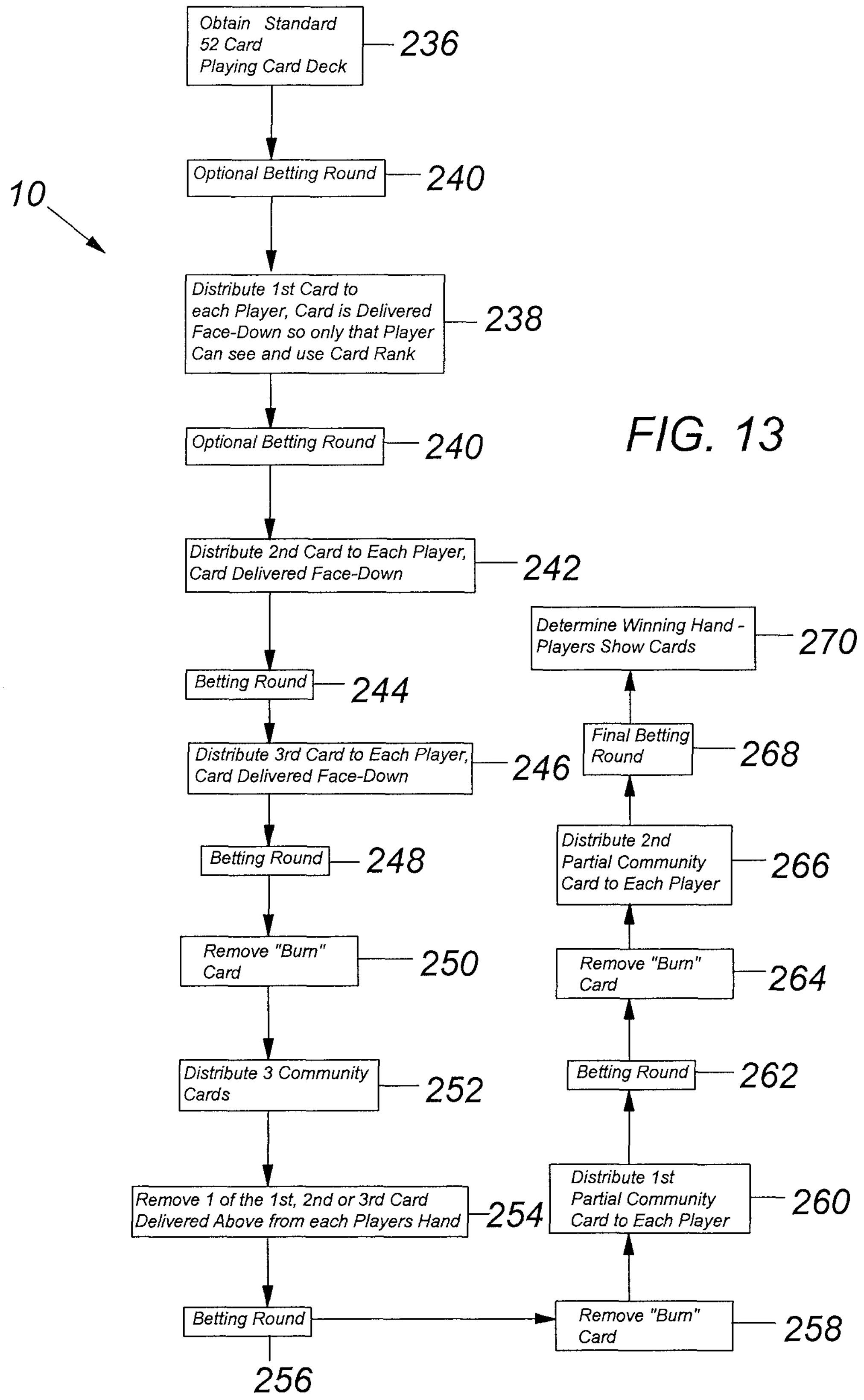
FIG. 13 is a flowchart illustrating the primary steps of an alternative version, known as Crazy Cut-Pineapple, of the card game in accordance with the instant invention.

Referring to FIG. 13, an alternative version of the game using partial community cards is shown. The game starts by the dealer obtaining cards from a standard deck, step 236, and delivering three face-down cards (Rounds 1-3), or hole cards, to each player, steps 238, 242, 246. Betting rounds may optionally occur in steps 240 and 244. Preferably, a betting round occurs in step 248. After all players have had an opportunity to place their bet, the dealer removes a burn card, step 250, before delivering three community cards (Round 4), step 252. These community cards are delivered face-up so all players can view their value. Additionally, each player can also use one, two, or three of these cards in determining their card-hand value. After the community cards have been delivered, each of the players discards one of the three face-down hole cards delivered to him/her, step 254. The discarded cards are removed from the game. A betting round occurs, step 256. The dealer removes a burn card, step 258, and delivers a fifth round of cards to each player, step 260. The fifth round card is a partial community card and is delivered face-up. All players can view the value of the card, however, only the player who received the card can use its value in determining his/her winning hand. A betting round occurs, step 262. After a burn card is removed, step 264, a sixth and final round of cards are delivered to each player, step 266. The final round cards are partial community cards. A single card is delivered face-up to each individual player. Since the cards are delivered face up, all players can view the card rank; players cannot use the card rank to form winning hands. A final betting round is performed, step 268, and the players enter the showdown, step 270, by revealing their cards. The player with the highest hand wins.

Figure 14:
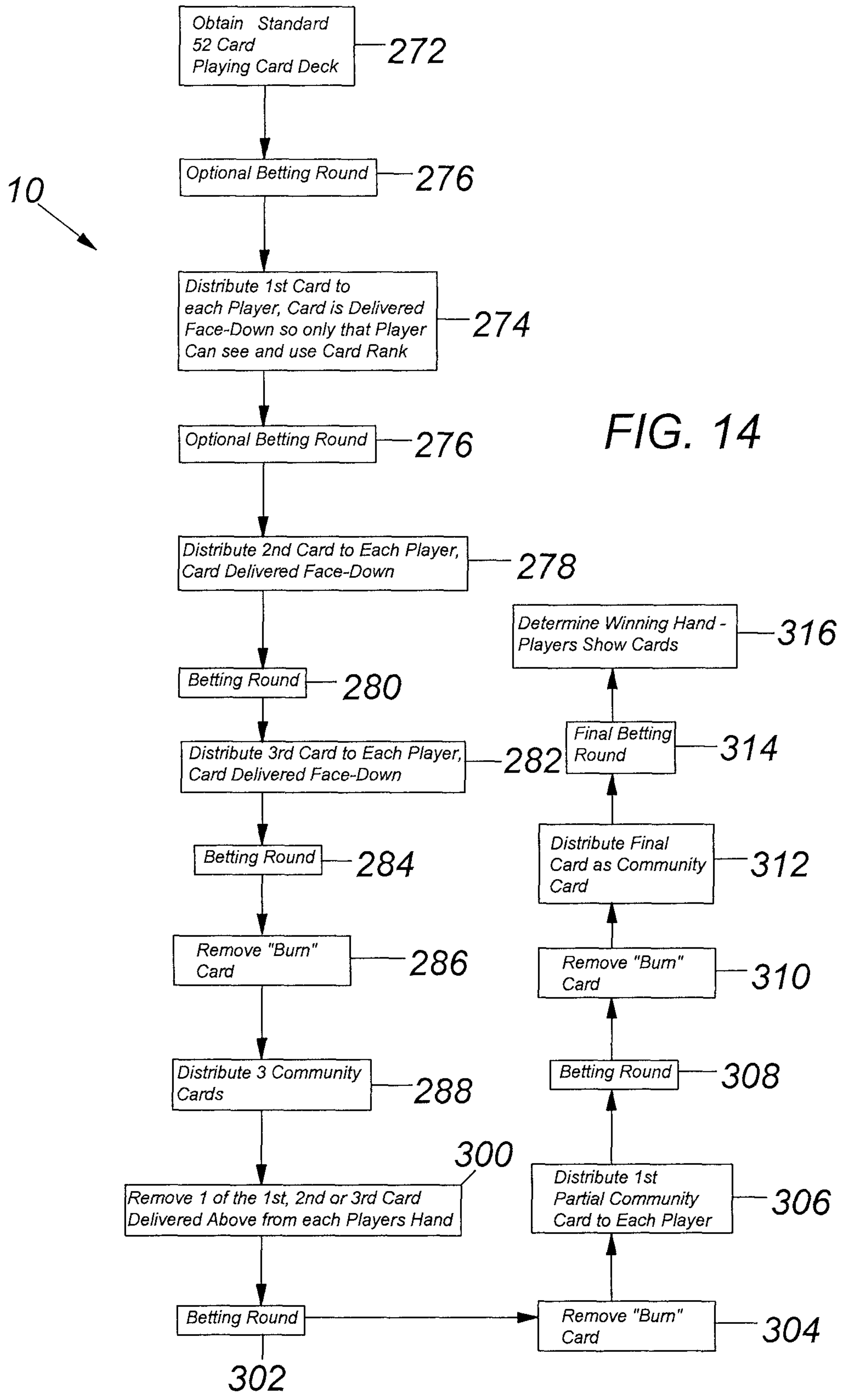
FIG. 14 is a flowchart illustrating the primary steps of an alternative version, known as Short-cut Crazy Cut-Pineapple, of the card game in accordance with the instant invention.

Alternative Version 6: Crazy-Short Cut Pineapple:

Referring to FIG. 14, an alternative version of the game using partial community cards is shown. The game starts by the dealer obtaining cards from a card deck, step 272, and delivering three face-down cards (Rounds 1-3), or hole cards, to each player, steps 274, 278, and 282. A betting round occurs in step 284 after all cards have been distributed. Alternatively, betting rounds can be undertaken after each card is distributed, steps 276, 280. After all players have had an opportunity to place their bet, the dealer removes a burn card, step 286, before delivering three community cards (Round 4), step 288. These community cards are delivered face-up so all players can view their value. Additionally, each player can also use one, two, or three of these cards in determining their card-hand value. After the community cards have been delivered, each of the players discards one of the three face-down cards delivered to him/her, step 300. The discarded cards are removed from the game. A betting round occurs, step 302. The dealer removes a burn card 304 and distributes a fifth round card, step 306, in a face-up manner so that all players can view the cards value. However, the card is a partial community card since the value of the card delivered can only be used by the individual player who received the card. While the individual player is the only one who may use the card in determining an overall winning hand, other players can use the information, i.e. the card value showing, to help determine how to play-out the game, including how to bet, should he/she remain in the game. After a betting round, step 308 and removal of a burn card, step 310, the dealer delivers a final round, single community card, step 312. This card is a traditional community card in that each player can use the card value in forming a winning hand. A final round of betting is undertaken, step 314. Once the betting is complete, the players reveal their cards, step 316. The player with the highest hand wins.

Alternative Version 7: Crazy Pineapple-Final-Cut

Figure 15:
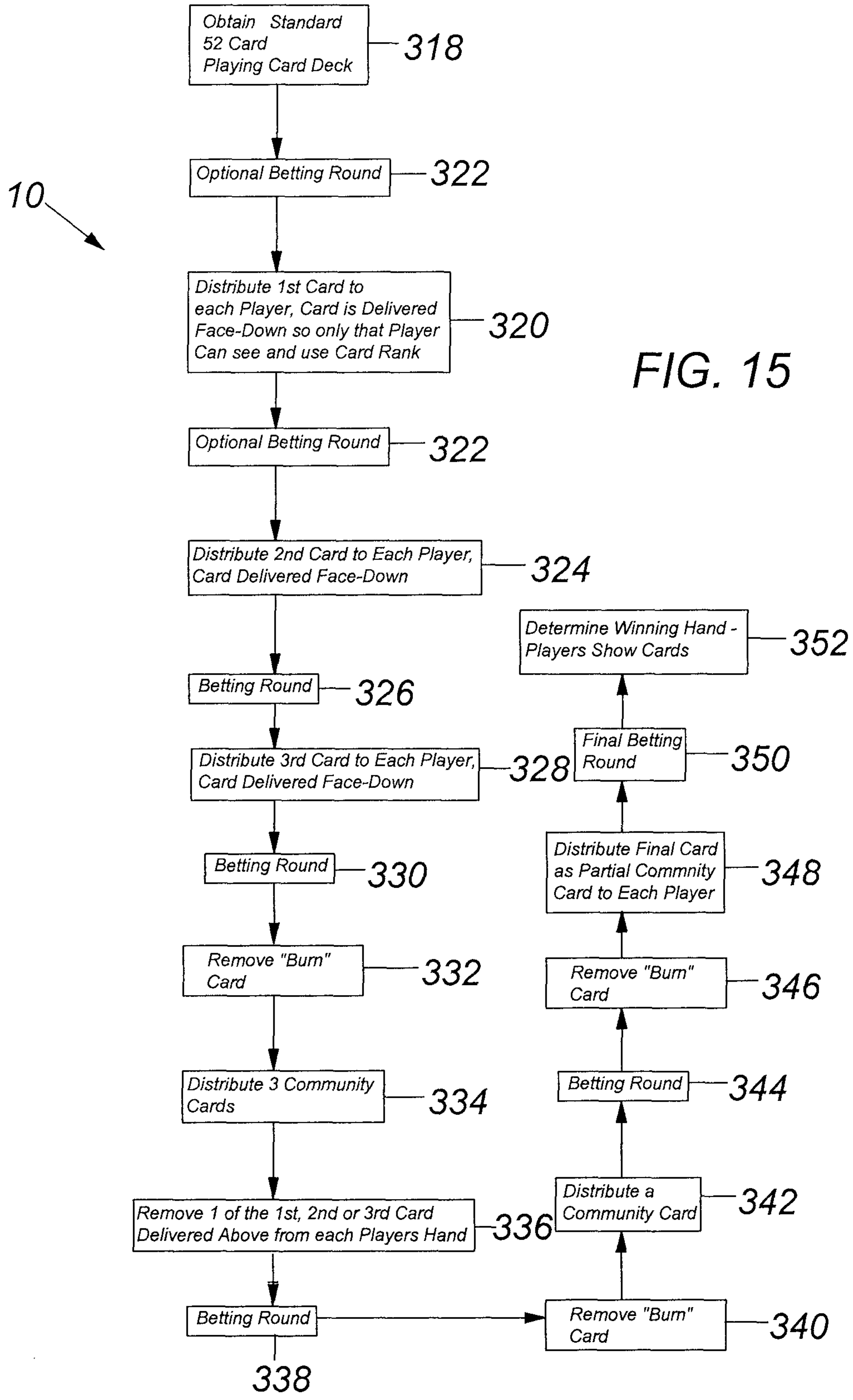
FIG. 15 is a flowchart illustrating the primary steps of an alternative version, known as Final-Cut Crazy Cut-Pineapple, of the card game in accordance with the instant invention.

Referring to FIG. 15, an alternative version of the game using partial community cards is shown. The game starts by the dealer obtaining cards from a playing deck, step 318, and delivering three face-down cards, or hole cards (Rounds 1-3), to each player, steps 320, 324, and 328. A preferable betting round occurs in step 330 after all cards have been distributed. Alternatively, betting rounds 322, 326 may occur in between delivering the cards. After all players have had an opportunity to place their bet, the dealer removes a burn card, step 332, before delivering three community cards, step 334. These community cards (Round 4) are delivered face-up so all players can view their value. Additionally, each player can also use one, two, or three of these cards in determining their card-hand value. After the community cards have been delivered, each of the players discards one of the three face-down cards delivered to him/her, step 336. The discarded cards are removed from the game. A betting round occurs, step 33. The dealer removes a burn card, step 340. A single fifth round card is distributed, step 342. The fifth card is a traditional community card, delivered face-up. Each player can use the card value in forming a winning hand. A round of betting is undertaken, step 344, and a burn card is removed 346. The sixth and final round of cards is delivered, step 348. Each player receives one partial community card. The sixth round card is delivered face-up so all players can view the value of each of the cards that were dealt. However, the card is a partial community card since the value of the card delivered can only be used by the individual player who received that card. While the individual player is the only one who may use the card in determining an overall winning hand, other players can use the information, i.e. the card value showing, to help determine how to play-out the game, including how to bet, should he/she remain in the game. A final round of betting is undertaken, step 350. Once the betting is complete, the players reveal their cards, step 352. The player with the highest hand wins.

While each of the games embodied above require each player to use both of the two individual cards distributed in the first game, each game can be modified so that each player is only required to use one of the two individual cards to form a best five card ranked hand.

Each of the games described above can also be adapted to be played in electronic versions. The electronic versions can be played using a gaming device, stand alone or hand held versions, having a main unit which stores and provides support for displays, inputs, controls, and any other features to provide a free standing functional unit. As an illustrative example, the gaming device may include at least one processor, such as a microprocessor, a microcontroller-based platform, or interacted circuits, operatively connected to data storage devices or memory devices, such as random access memory (RAM) or read only memory (ROM), or other suitable magnetic, optical memory known to one of skill in the art can be used. The memory storage can be designed to hold any program code and instructions which are executable by the processor to control the game play. The gaming device further includes user input devices, such as buttons, that allow the player to receive or dispense of cards which are visualized on a display screen. Alternatively, the device may utilize a touch screen with touch screen capability as known to one of skill in the art. The gaming device may be a stand alone device in which a single player plays against one or more computer generated players. Alternatively, the gaming device may be adapted to have the capability to play with other remote players. For example, the gaming device would be linked to a central server as well as other remote player devices so that all players could play in the same manner as if they were playing on a live table in a casino. Finally, the methods of game play in accordance with the present invention may be adapted to be playable on a smart phone or tablet, via an application such as the APPLE IPHONE apps, or APPLE IPAD apps.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of playing a modified poker game through an electronic device configured to display images of playing cards using one or more individual use cards, one or more community cards, and one or more partial community cards comprising the steps of:

providing a computer readable medium coded with instructions and executed by a processor to perform the steps of:

providing at least one full deck of standard playing cards, each card having a value which forms a winning hand;

distributing a first set of individual use cards to one or more individual players playing said game; said first set of playing cards comprising cards from said playing deck and having a card value which can only be used by each individual holding said cards in forming a winning hand, said first set of cards distributed in a manner so that only said individual receiving said cards can view;

after distributing said first set of individual use cards, distributing a second set of playing cards to form a plurality of community cards; said second set of playing cards comprising cards from said playing deck and having a card value in which each individual player can view and use to form a winning hand;

after distributing said second set of playing cards, distributing a third set of playing cards to form one or more partial community cards; said third set of playing cards comprising cards from said playing deck and having a card value in which each player playing said game can view, but only said individual player for which said card has been distributed thereto can use to form said winning hand; and determining a winning card hand, said winning card hand having the highest card rank obtained from said first set of cards, said second said of cards, and said third set of cards.

2. The method of playing a card game using one or more partial community cards according to claim 1 wherein the step of determining a winner is based on said at least one player having a plurality of cards with the highest ranking hand according to traditional poker rules.

3. The method of playing a modified poker game using one or more individual use cards, one or more community cards, and one or more partial community cards according to claim 1 further including at least one betting round.

4. The method of playing a modified poker game using one or more individual use cards, one or more community cards, and one or more partial community cards according to claim 3 wherein said betting round occurs prior to, during, after, or combinations thereof, said distribution of said first set of cards.

5. The method of playing a modified poker game using one or more individual use cards, one or more community cards, and one or more partial community cards according to claim 4 further including at least one betting round after said distribution of said second set of cards.

6. The method of playing a modified poker game using one or more individual use cards, one or more community cards, and one or more partial community cards according to claim 5 further including at least one betting round in between, after or combinations thereof, of said distribution of said third set of cards.

7. The method of playing a modified poker game using one or more individual use cards, one or more community cards, and one or more partial community cards according to claim 3 wherein said distribution of said first set of playing cards includes distributing an initial card to each said at least one individual playing said game, and distributing a second card to each said at least one individual playing said game after each player receives said initial card.

8. The method of playing a modified poker game using one or more individual use cards, one or more community cards, and one or more partial community cards according to claim 7 wherein said distribution of said second set playing cards includes distributing three cards at one time in a manner so that each said at least one individual playing said game can view said cards.

9. The method of playing a modified poker game using one or more individual use cards, one or more community cards, and one or more partial community cards according to claim 8 wherein said distribution of said third set playing cards includes distributing a first third set card to each said at least one individual playing said game and distributing a second third set card to each said at least one individual playing said game after each player receives said first third set card.

10. The method of playing a modified poker game using one or more individual use cards, one or more community cards, and one or more partial community cards according to claim 3 wherein said distribution of said playing cards includes the steps of:

distributing said first set cards by delivering an initial first set card to each said at least one individual playing said game followed by distributing a second first set card to each said at least one individual playing said game after each player receives said initial first set card;

distributing said second set of cards by delivering three community cards at one time in a manner so that each said at least one individual playing said game can view and use said cards;

distributing said third set cards by delivering one partial community card to each said at least one individual playing said game; and distributing another second set of cards by delivering one community card so that each said at least one individual playing said game can view and use said card.

11. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game followed by distributing a second first set card to each said at least one individual playing said game after each player receives the initial first set card;

distributing said second set of cards by delivering four community cards, wherein three said community cards are delivered at one time followed by delivery of said fourth community card;

distributing one third set of cards by delivering a first partial community card and distributing a second partial community card to each said at least one individual playing said game after each player receives said first partial community card.

12. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after said player receives said initial first set card, and distributing a third first set card to each said at least one individual playing said game after each player receives the second first set card;

each of said at least one individual playing said game removes one of said three cards from said first set of cards from said hand;

distributing said second set cards by delivering three community cards at one time in a manner so that each said at least one individual playing said game can view and use said cards; and distributing said third set cards by delivering one partial community card to each said at least one individual playing said game and distributing a second partial community card to each said at least one individual playing said game after each player receives said first partial community card.

13. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after each player receives said initial first set card, and distributing a third first set card to each said at least one individual playing said game after each player receives said second first set card;

each of said at least one individual playing said game removes one of said three cards from said first set of cards from said hand;

distributing said second set cards by delivering three community cards at one time in a manner so that each said at least one individual playing said game can view and use said cards;

distributing said third set cards by delivering a first partial community card to each said at least one individual playing said game; and distributing an additional second set card by delivering one community card to said at least one individual playing said game in a manner so that each said at least one individual playing said game can view and use said card.

14. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after each player receives said initial first set card, and distributing a third first set card to each said at least one individual playing said game after each player receives said second first set card;

each of said at least one individual playing said game removes one of said three cards from said first set of cards from said hand;

distributing said second set of cards by delivering three community cards at one time in a manner so that each said at least one individual playing said game can view and use said cards;

distributing an additional second set card by delivering one community card in a manner to each said at least one individual playing said game; and distributing said third set cards by delivering one partial community card to each said at least one individual playing said game.

15. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after each player receives said initial first set card, and distributing a third card to each said at least one individual playing said game after each player receives said second first set card;

distributing said second set of cards by delivering three community cards at one time in a manner so that each said at least one individual playing said game can view and use said cards;

each of said at least one individual playing said game removes one of said first set cards from said hand;

distributing said third set of cards by delivering one partial community card to each said at least one individual playing said game, distributing a second third set card by delivering a second partial community card to each said at least one individual playing said game after each said at least one individual playing receives said first partial community card.

16. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after each player receives said initial first set card, and distributing a third first set card to each said at least one individual playing said game after each player receives said second first set card;

distributing said second set of cards by delivering three community cards at one time in a manner so that each said at least one individual playing said game can view and use said cards;

each of said at least one individual playing said game removes one of said first set of cards from said hand;

distributing said third set cards by delivering one partial community card to each said at least one individual playing said game; and distributing an additional second set card by delivering one community card in a manner so that each said at least one individual playing said game can view and use said card.

17. The method of playing a modified poker game using one or more individual use cards, one or more community cards, and one or more partial community cards according to claim 3 wherein said distribution of said playing cards includes the steps of:

distributing said first set of cards by delivering an initial first set card to each said at least one individual playing said game, distributing a second first set card to each said at least one individual playing said game after each player receives said initial first set card, and distributing a third first set card to each said at least one individual playing said game after each player receives said second first set card;

distributing said second set of cards by delivering three community cards at one time in a manner so that each said at least one individual playing said game can view and use said cards;

each of said at least one individual playing said game removes one of said first set cards from said hand;

distributing an additional said second set card by delivering one community card in a manner so that each said at least one individual playing said game can view and use said card; and distributing said third set of cards by delivering one partial community card to each said at least one individual playing said game.

18. The method of playing a modified poker game using one or more individual use cards, one or more community cards, and one or more partial community cards according to claim 1 wherein at least one individual playing said game is a dealer, said determination of said winning hand is determined by any player having a higher card rank obtained from said first set of cards, said second said of cards, and said third set of cards than said dealer.

* * * * *